United States Patent
Burns et al.

(10) Patent No.: US 10,742,760 B2
(45) Date of Patent: Aug. 11, 2020

(54) NEWORKING INTERNET OF THINGS (IOT) DEVICES

(71) Applicant: INTEL CORPORATION, Santa Clara, CA (US)

(72) Inventors: Gregory Burns, Seattle, WA (US); Todd Malsbary, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/347,737

(22) PCT Filed: Nov. 15, 2016

(86) PCT No.: PCT/US2016/062044
§ 371 (c)(1),
(2) Date: May 6, 2019

(87) PCT Pub. No.: WO2018/093351
PCT Pub. Date: May 24, 2018

(65) Prior Publication Data
US 2019/0289091 A1   Sep. 19, 2019

(51) Int. Cl.
*H04L 29/08* (2006.01)
(52) U.S. Cl.
CPC .............. *H04L 67/26* (2013.01); *H04L 67/12* (2013.01); *H04L 67/125* (2013.01); *H04L 67/2809* (2013.01); *H04L 67/2828* (2013.01)
(58) Field of Classification Search
CPC ... H04L 67/2809; H04L 67/26; H04L 67/125; H04L 67/2828
See application file for complete search history.

(56) References Cited

U.S. PATENT DOCUMENTS

| 2007/0143442 A1 | 6/2007 | Zhang et al. |
| 2008/0133541 A1 | 6/2008 | Fletcher et al. |
| 2010/0040066 A1* | 2/2010 | Hao ........................ H04L 45/00 370/395.31 |
| 2011/0289163 A1 | 11/2011 | Edwards et al. |

(Continued)

FOREIGN PATENT DOCUMENTS

KR   101602100 B1   3/2016

OTHER PUBLICATIONS

International Search Report for PCT/US2016/062044 with a filing date of Nov. 15, 2016 and dated Jul. 28, 2017, 2 pages.

*Primary Examiner* — Benjamin M Thieu
(74) *Attorney, Agent, or Firm* — International IP Law Group, P.L.L.C.

(57) ABSTRACT

Techniques for implementing a publish-subscribe messaging system are disclosed. An example device generates a topic string comprising a string of characters that represent a subscription to a requested publication. A subscription filter is computed based on the topic string. The device is configured to receive a publication, which includes a data payload and a publication filter. The device performs a bitwise comparison of the subscription filter and the publication filter to determine whether the publication is a destination match for the subscription. If the publication is a destination match for the subscription, the device consumes the data payload of the publication.

25 Claims, 9 Drawing Sheets

(56) References Cited

U.S. PATENT DOCUMENTS

| | | | |
|---|---|---|---|
| 2012/0051363 A1* | 3/2012 | Zahemszky | H04L 45/14 |
| | | | 370/392 |
| 2016/0050269 A1 | 2/2016 | Botticelli | |
| 2019/0079998 A1* | 3/2019 | Rush | G06F 16/335 |

* cited by examiner

100

NEWORKING INTERNET OF THINGS (IOT) DEVICES

CROSS REFERENCE TO RELATED APPLICATIONS

Pursuant to 35 U.S.C. § 371, this application is the United States National Stage Application of International Patent Application No. PCT/US2016/062044, filed on Nov. 15, 2016, the contents of which are incorporated by reference as if set forth in their entirety herein.

TECHNICAL FIELD

The present techniques relate generally to Internet of Things (IoT) devices. More specifically the present techniques relate to techniques for supporting a publish-subscribe model for communication between IoT devices.

BACKGROUND

The internet of things (IoT) is a concept in which a large number of computing devices are interconnected to each other and to the Internet to provide functionality and data acquisition at very low levels. For example, IoT networks may include commercial and home automation devices, such as water distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. It has been estimated that the Internet of Things (IoT) may bring Internet connectivity to 50 billion devices by 2020.

BRIEF DESCRIPTION OF THE DRAWINGS

FIG. 9 is a block diagram of an example of components that may be present in a device that is part of a distributed publication/subscribe network The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
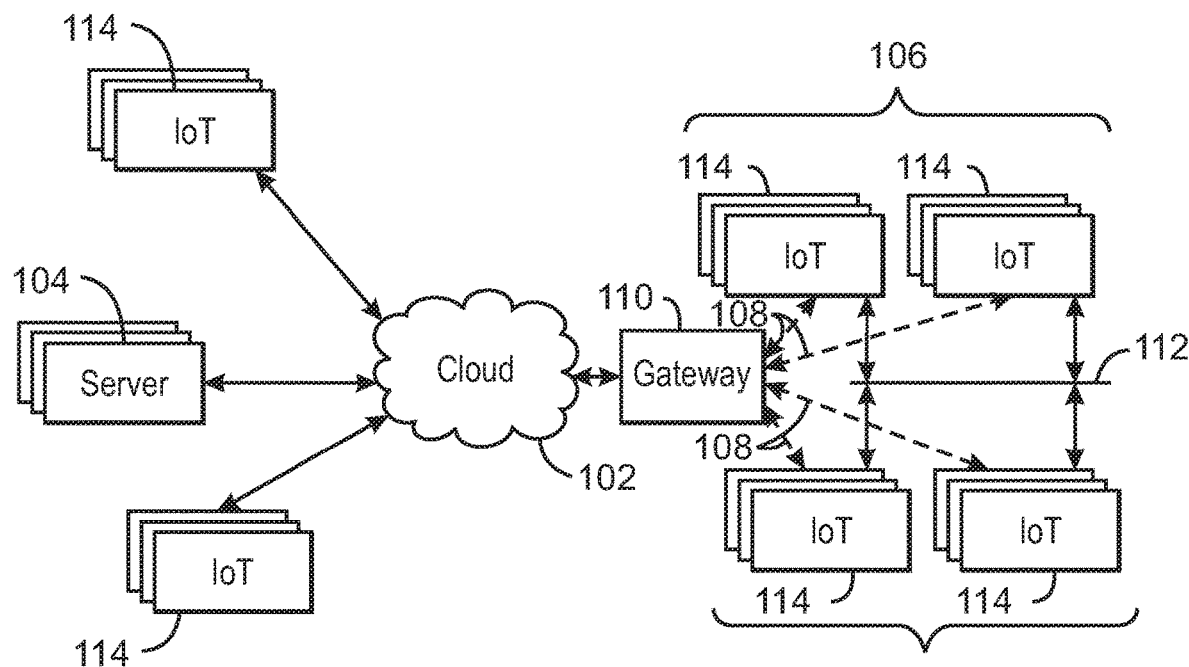
FIG. 1 is a drawing of a cloud computing network in communication with a number of Internet of Things (IoT) devices.

The techniques disclosed herein provide a distributed publish-subscribe messaging system for networking IoT devices. Most publish-subscribe messaging protocols rely on a centralized broker to forward messages from publishers to subscribers. In such systems, all network traffic goes through the broker. Thus, the network cannot scale up without scaling up the broker. Additionally, the broker is a single point of failure, and the round-trip to the broker adds communication latency.

The distributed publish-subscribe messaging system described herein is able to dynamically form a multiply connected mesh network without depending on a centralized broker. The system uses topic strings, which are encoded as Approximate Member Query (AMQ) filters, such as Bloom filters or Quotient filters. An AMQ filter is a probabilistic data structure used to test whether an element is a member of a set. The result of a query specifies either that the element is definitely not in the set or that the element is probably in the set. Thus, queries have the possibility of resulting in false positives, but not false negatives. Bloom filters and Quotient filters have additional properties that enable them to be easily merged and resized without rehashing the original topic strings. For example, two Bloom filters can be merged by performing a bitwise OR operation on each of the corresponding bits in the two filters. The following description describes the use of Bloom filters. However, it will be appreciated that other types of AMQ filters may also be used in some embodiments.

A publication includes one or more topic strings where each string consists of a series of tokens separated by one more possible separator characters. A subscription similarly comprises one of more topic strings of the same form as a publication except that the topic strings in a subscription can include one or more wildcard characters. The AMQ filter encodings of the subscriptions and publication topics are propagated between nodes in the network. As a network node receives subscriptions it dynamically builds a routing table that determines where publications should be forwarded. In embodiments in which the AMQ filters are Bloom filters, all of the routing and forwarding decisions can be made using computationally efficient bitwise AND (set intersection) and OR (set union) operations on the Bloom filters. Accordingly, the system described herein can be implemented using a relatively small amount of computational resources, which makes the system amenable to implementation on very small devices such as sensors that primarily publish data. The system is well suited for applications that leverage edge computing in combination with cloud-based analytics.

Each node in the network can forward publications to subscribers in the network using hop-by-hop routing. All publication and subscriptions are implicitly hashed, and nodes in the network may route publications only to nodes that have matching subscribers, so there is typically no single point through which all messages pass. These features improve the privacy of IoT communications over the network.

FIG. 1 is a drawing of a cloud computing network in communication with a number of Internet of Things (IoT) devices. The cloud 102 may represent the Internet, or may be a local area network (LAN), or a wide area network (WAN), such as a proprietary network for a company. The IoT devices may include any number of different types of devices, grouped in various combinations. For example, an IoT group 106 may include IoT devices within a home, an industrial setting, a retail environment, hospital, and others.

The IoT group 106, or other subgroups, may be in communication with the cloud 102 through wireless links 108, such as LPWA links, and the like. Further, a wired or wireless sub-network 112 may allow the IoT devices to communicate with each other, such as through a local area network, a wireless local area network, and the like. The IoT devices may use another device, such as a gateway 110 to communicate with the cloud 102. Any number of communications links may be used in the sub-network 112. Shorter-range links, for example, compatible with IEEE 802.15.4 may provide local communications between IoT devices. Longer-range links, for example, compatible with LPWA standards, may provide communications between the IoT devices and the gateways 110. The network topology can be manually configured or can use IP multicast to bootstrap connections on a single subnet.

Other groups of IoT devices 114 may also be coupled to the cloud 102. Each of these IoT devices 114 may communicate with other IoT devices, with servers 104, or both. As can be seen from FIG. 1, a large number of IoT devices may be communicating through the cloud 102. The IoT devices may be configured to request or provide information to other devices autonomously.

Communication between the network devices is accomplished using the distributed publish-subscribe system described herein. Any of the network devices, including IoT devices 114, servers 104, and IoT devices in IoT group 106 may operate as a publisher, a subscriber, or both. The distributed publish-subscribe system operates as a loosely coupled network, wherein each device can function as subscriber, publishers, both or neither. Loosely coupled means that the nodes may hold state information about other nodes on a short or long term basis but do not necessarily maintain network connectivity to other nodes. There are no predesignated roles. Any node can publish topics or subscribe to topics. Connections between devices in the network last long enough to send a single subscription or publication message, and long-term end-to-end network connections are not needed. Furthermore, the distributed publish-subscribe system does not use a central broker to coordinate communications between the publishers and subscribers. The distributed publish-subscribe system is described further in relation to FIG. 2

Figure 2:
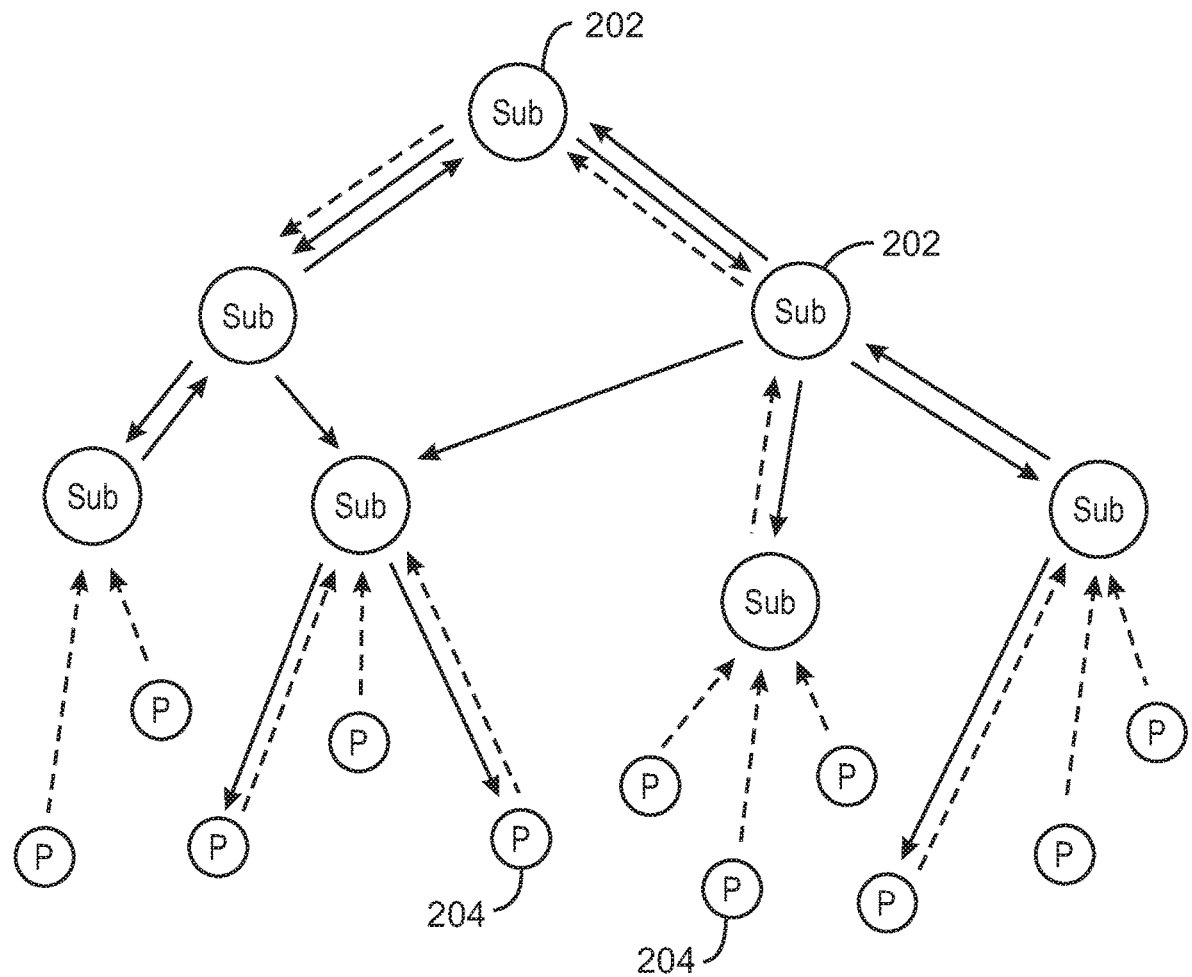
FIG. 2 is a diagram illustrating a distributed network of subscriber nodes and publisher nodes.

FIG. 2 is a diagram illustrating a distributed network of subscriber nodes and publisher nodes. Each subscriber node 202 represents a device that is presently acting as a subscriber, and can include any of the network devices shown in FIG. 1. Each publisher node 204 represents a device that is presently acting as a publisher, and can include any of the network devices shown in FIG. 1. The messages routed between the nodes include subscriptions, publications, and acknowledgements. In FIG. 2, subscriptions are represented by the solid lines and publications are represented by dashed lines.

Subscriptions are generated by the subscriber nodes 202 and sent out onto the network. Each subscription includes one or more encoded topic strings that represent the type of data that the subscriber node is requesting. The subscriptions flood throughout the network and can be forwarded in either direction, possibly over multiple routes. Upon receipt of a subscription, the receiving node stores the encoded subscription information to a routing table and forwards subscription information to the other nodes in the form of routing vectors, which are described further below. The routing vectors are passed downstream to subscriber nodes that have direct link with publisher nodes.

Publications are generated by the publisher nodes 204 and may be sent onto the network via unicast or multicast messaging. Publication are passed upstream to the destination subscriber nodes. Publications include one or more encoded topic strings that represent type of information provided by the publisher node. Publications flow on routes that have matching subscriptions. Thus, if a node receives a publication, the publication is forwarded if the publication matches at least one of the subscriptions stored in the node's routing table. In the steady state, a publication reaching any node will be routed from that node to all matching subscriber nodes. Each publication carries a data payload representing the data provided by the publisher node. In some cases, subscriber nodes may optionally return an acknowledgement back to a publisher node upon receipt of a publication. The acknowledgement may be routed to the publisher node by hop-by-hop forwarding in the reverse path of the publication. Acknowledgements may optionally include a data payload.

In some examples, the publisher nodes 204 can be configured to support data series. If a publisher node supports data series, every publication may have a universally unique identifier (UUID) and serial number. Publications with the same UUID and topic strings form a series. The serial number may be incremented each time the publication is sent to the network. The UUID and serial number are provided to the receiving subscribers as a part of the publication's data payload.

If a node in the network receives a publication and there are no matching subscribers currently available to accept the publication, the publication may be discarded. In some cases, the node may retain the publication for later delivery until there is a matching subscriber available to receive the message. In some embodiments, an expiration time period can be set on a publication, which is then held for delivery up until the expiration time period has passed. A retained publication can be replaced if the publisher sends a new publication having the same UUID but a later serial number. A retained publication can be explicitly expired, for example, by sending a new publication with the same UUID and a negative expiration time period.

Retained publications provide support for sleepy nodes, that is, nodes that are only periodically active on the network. For example, a wireless sensor node may publish a telemetry reading in the payload of a retained publication with specified expiration time period then drops into a low power mode, waking within specified expiration time period to deliver the next reading. The most recent telemetry will be available to subscribers no matter when they join the network. Similarly, a sleepy subscriber can periodically connect to the network to receive publications updates. Retained publications can also be used for events, that is sensor readings that indicate state changes, for example indicating a maintenance panel has been opened.

Each node builds and manages routing tables based on the subscription topics it receives from other subscriber nodes. The routing tables are used to forward publications hop-by-hop from publishers to subscribers. Nodes with multiple network interfaces can automatically route publications between networks. Nodes can send publications on a local subnet using IP multicast, can be manually configured to connect to other nodes, or can use a directory service to locate other nodes. Publication routing is independent from the network level connections, so that if there is at least one network path, publications will be routed to all subscribing nodes. The hop-to-hop connections may be secured using industry standard protocols such as SSL, TLS, DTLS, HTTPS, etc.

Publications and subscriptions include a collection of topic strings, which are encoded as AMQ filters. Topic-string is a common industry term used in several existing pub/sub protocols. A subscription is a collection of topic strings where a topic string is a list of elements separated by a separator character. Examples of three possible topic strings are shown in the table below.

| foo/bar | xyz/abc xyz/def | foo/* xyz/* |

For the sake of clarity, the example topic strings are displayed as text strings and the separator is indicated as a backslash ("/"). However, in an actual implementation, the topic strings may not be textual and may or may not be human readable. The subscriptions can also include wildcards that represent unspecified elements that will match to any element in a publication. In the examples below, the wildcards are shown as asterisks (*).

The subscription "foo/bar" includes the elements "foo" and "bar" and matches to a publication with the exact string "foo/bar". The subscription "foo/* xyz/*" includes wildcards and will match any publication that has both a topic starting with "foo" and a topic starting with "xyz". Subscriptions with more than one topic string will only match publications that contain all of the topic strings. For example, the subscription "xyz/abc xyz/def" matches only those publications that contain the two strings "xyz/abc" and "xyz/def".

Publications take the same form as subscriptions but do not have wild cards. A publication is a match for a subscription if the publication contains a matching topic string for each of the topic strings in the subscription. For example, the publication "foo/bar hello/world" is a match for the subscription "foo/bar" because it contains "foo/bar". As another example, the subscription "foo/bar hello/world" would also match the subscription "hello/world". The publication shown below matches all of the subscriptions listed above.

| foo/bar xyz/abc xyz/def |

Allowing publications and subscriptions to include multiple topic strings improves the versatility of the system. For example, a set of devices acting as publishers may publish a first topic string describing device type and a second topic string describing the physical location of the device. A subscriber node in the network could subscribe to all devices at a specific location by only specifying the location topic string. Additionally, the subscriber node could subscribe to all devices of a specific type by only specifying the device type. The subscriber node could also subscribe to a device of a specific type and at specific location by using both topic strings in the same subscription.

Topics strings are hashed and encoded as AMQ filters. The AMQ filter representing the publication is referred to herein as the publication filter. The AMQ filter representing the subscription is referred to herein as the subscription filter. In some embodiments, the AMQ filters are Bloom filters. However, other types of AMQ filters, such as quotient filters, are possible. Various techniques can be used to encode and hash the topic strings, so long as both publishers and subscriber agree on the details of the hashing and encoding process. In all cases, the resulting AMQ filter is a bit vector wherein the set bits identify the elements that have been added to the AMQ filter. A set bit is a bit that is set to a value of "1". The AMQ filters may be a fixed size or variable size. The publications and subscriptions may also be preprocessed as described below before generating the AMQ filters.

To generate the publication filter, the publication topic strings are decomposed into substrings and each substring is individually inserted into the publication filter. A publication is encoded into a publication filter so that the bits set encompass all the bits that might be set for matching subscriptions, possibly allowing for the possibility of wildcards. This is achieved by hashing various prefix and suffix strings into the publication filter. For example, to encode the publication topic string "a/b/c" the following substrings can be inserted into the publication filter:

| a/b/c | a/ | /b/ | a/b/ | //c | //+ | //# | /# |

Other approaches can be used so long as the publishers and subscribers agree on the encoding. In the above example, the separators are encoding into the substrings. Additionally, there are two types of wildcards. The plus sign represents a wildcard that provides a match for any single element. The pound symbol represents a wildcard that provides a match for any number of additional elements. Accordingly, the substring "//#" will match any subscription with at least three elements of any form, and the substring "/#" will match any subscription with at least two elements of any form.

The particular substrings encoded into the publication filter may be controlled by the publisher. In this way, the publisher has some degree of control over the kinds of wild-card matches a subscriber is permitted to use. For example, a publisher can decide that wild-card matches must fully specify a minimum set of elements in order to match. This can provide some degree of control over wide-open wildcard subscriptions such as "+/#". For example, given the publication topic string "a/b/c", if a publisher is configured to allow matches only if the subscription matches at least one of the first two elements, the publisher may generate the following substrings:

| a/b/c | a/ | /b/ | a/b/ |

If a publisher disallows wildcard matches altogether, then the whole publication topic string may be added to the publication filter without generating any additional substrings.

After the substrings are obtained, each substring is added to the publication filter. If Bloom filters are used, each substring is added to the publication filter by hashing the substring N times using N different hash functions. A bit index is derived from each hash value and the corresponding bit is set in the bit vector of the publication filter. For a publication with multiple topic strings each topic string is individually inserted into the publication filter.

For subscription topic strings, the number of substrings to be encoded depends on what wildcards appear in the topic string. The table below represents examples of subscription strings and how they can be preprocessed before being encoded. The left column represents example subscription strings, and the right column represents the substrings that are generated.

| a/b/c | a/b/c |
| a/+/c | a/ //c |
| +/b/+ | /b/ //+ |

| +/b/c | /b/ //c |
| a/# | a/ |

After the substrings are obtained, each substring is added to the subscription filter. If Bloom filters are used, each substring is added to the subscription filter by hashing the substring N times using N different hash functions. A bit index is derived from each hash value and the corresponding bit is set in the bit vector of the subscription filter. For a subscription with multiple topic strings each topic string is individually inserted into the subscription filter. If should be clear to those practiced in the art that alternative encodings strategies can be employed so long as the publishers uses the same encoding strategy as their intended subscribers. Further, it is possible that multiple strategies may be in use simultaneously on one network within distinct publisher/subscriber populations.

To determine whether a subscription matches a publication, a bitwise comparison of the publication filter and subscription filter may be performed. In the case of Bloom filters, a publication is a destination match for the subscription if all of the bits in the subscription filter are also set in the publication filter.

Figure 3:
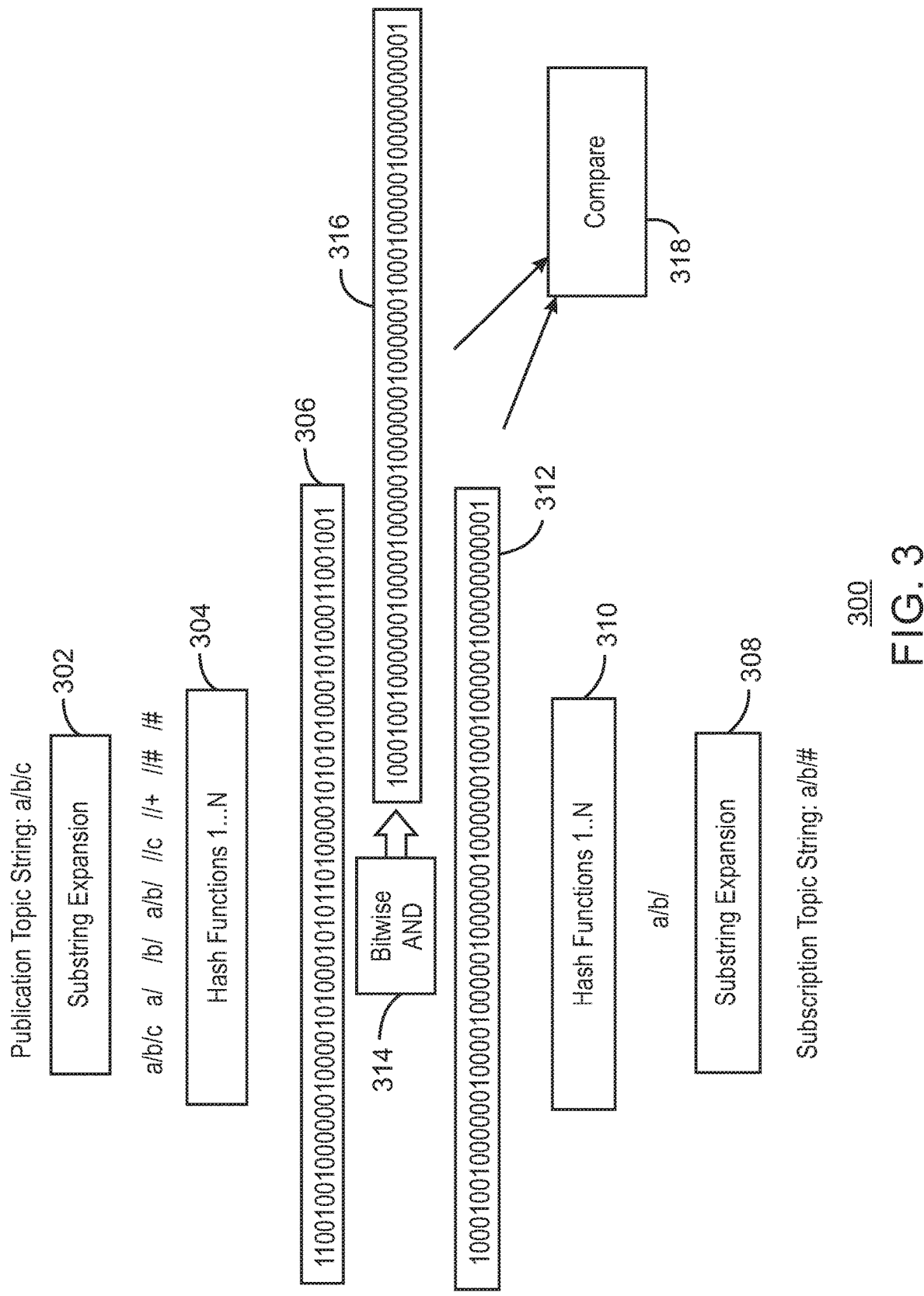
FIG. 3 is a diagram illustrating an example method of determining whether a subscriber node is a destination match for a publication.

FIG. 3 is a diagram illustrating an example method of determining whether a subscriber node is a destination match for a publication. Various aspects of the method 300 may be performed by different components of a network of publisher nodes and subscriber nodes, such as the network 200 shown in FIG. 2. In the method 300, the subscription filter and publication filter are Bloom filters and are referred to as a subscription Bloom filter and a publication Bloom filter.

At block 302, substring expansion is performed for a publication topic string as described above. At block 304, each of the substrings is added to the publication Bloom filter using the N hash functions. The result of the processing at block 302 and 304 is the bit vector 306, which represents the final publication Bloom filter. Blocks 302 and 304 may be performed by the publisher node that generates the publication. The final publication Bloom filter may be sent out over the network as described above.

At block 308, substring expansion is performed for a subscription topic string as described above. At block 310, each of the substrings is added to the subscription Bloom filter using the same N hash functions. The result of the processing at blocks 308 and 310 is the bit vector 312, which represents the subscription Bloom filter. Blocks 308 and 310 may be performed by the subscriber node that generates the subscription. The subscription Bloom filter is stored by the subscriber node and used when a publication is received to determine whether the received publication is a destination match for the subscription. The subscription Bloom filter may be stored until the subscription is canceled. Furthermore, it will be appreciated that a subscriber node may subscribe to more than one publication and may store a subscription Bloom filter for each of the subscriptions.

At block 314, a publication is received by the subscriber node, and the intersection of the publication Bloom filter and the subscription Bloom filter is computed through a bitwise AND operation. The intersection of the two Bloom filters results in the bit vector 316. At block 318, the bit vector 316 is compared to the subscription bit vector 312 to determine whether the publication and subscription match. Blocks 314 and 318 are performed by the subscriber node upon receipt of the publication. If the bit vector 316 and subscription bit vector 312 both have the same bits set, the subscription and publication match, and the publication is consumed by the subscriber node. Consuming the publication means that the subscriber node sends the publication to an application, which further processes the publication, for example, by extracting the data payload. The processing of the data payload depends on the particular use case.

In addition to determining whether the publication matches its own subscriptions, the subscriber node also routes the received publications to other subscriber nodes. Example processes for routing subscriptions and publications are described further in relation to FIGS. 4 and 5.

Figure 4:
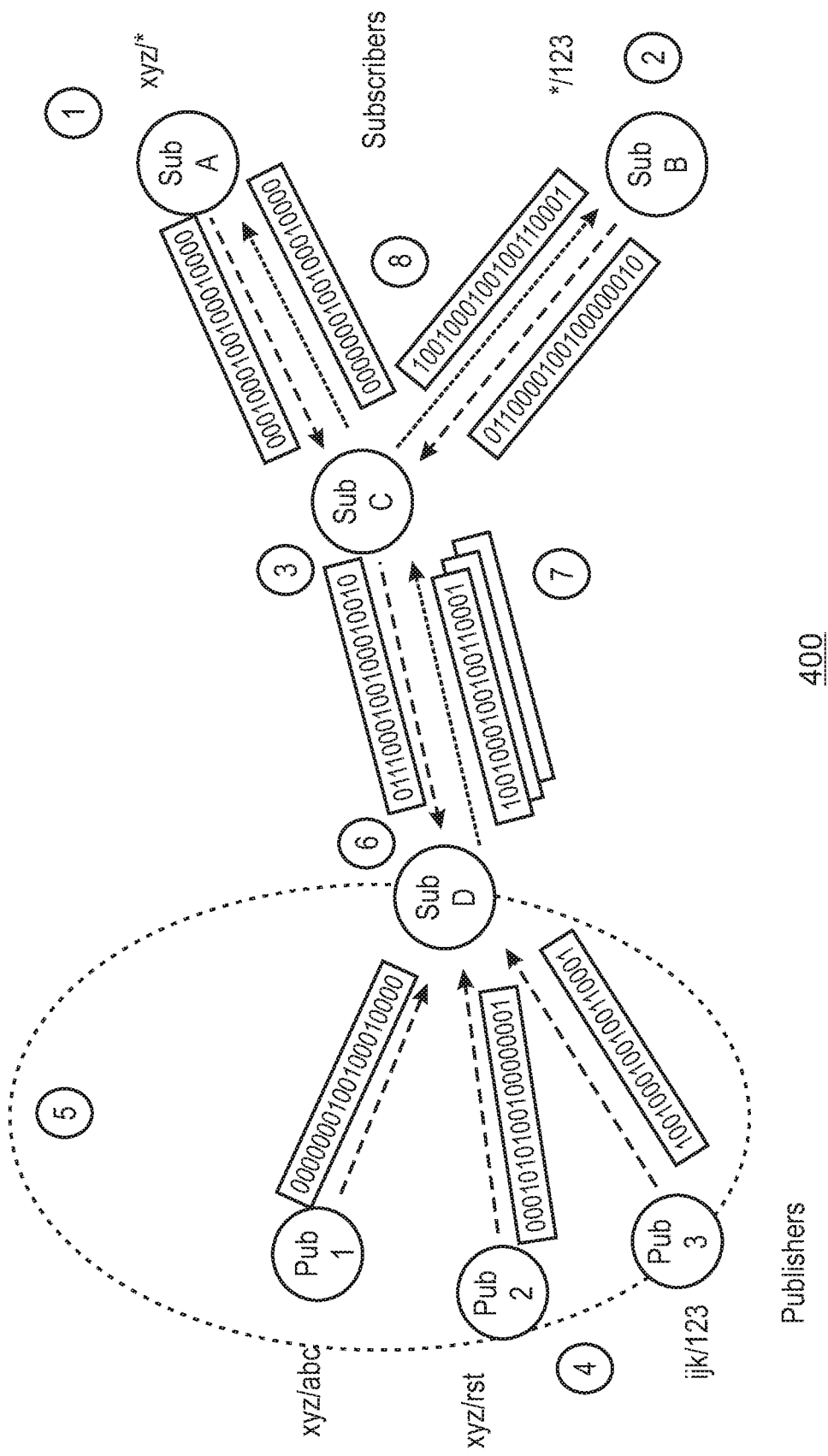
FIG. 4 is a diagram illustrating an example method of routing publications.

FIG. 4 is a diagram illustrating an example method of routing publications. The method is performed by a network such as the network 200 of FIG. 2. In the example shown in FIG. 4, the network includes three publisher nodes, Pub 1, Pub 2, and Pub 3, and four subscriber nodes Sub A, Sub B, Sub C, and Sub D. The subscriber node Sub A has a subscription Bloom filter, which is generated as described above and stored in memory. The subscriber node Sub B has its own different subscription Bloom filter, which is also generated as described above and stored in memory. In the method 400, the subscription filter and publication filter are Bloom filters and are therefore referred to as a subscription Bloom filter and a publication Bloom filter.

At stages 1 and 2, subscriber nodes Sub-A and Sub-B forward their subscription Bloom filters to the downstream subscriber node Sub C. A subscription Bloom filter that is forwarded to another subscriber node is referred to herein as an interests vector. The interests vectors may be compressed using, for example, run length encoding.

At stage 3, the subscriber node Sub-C stores both of the interests vectors to memory and also forms a union of the two interests vector by a bitwise OR operation. The union of the two interests vectors forms a combined interests vector that represents the subscriptions subscribed to by both Sub A and Sub B. The combined interests vector is forwarded to subscriber node Sub-D.

At stage 4, the publishers Pub-1, Pub-2, and Pub-3 generate publication Bloom filters as described above. At stage 5, the publication Bloom filters are sent to the network and received at subscriber node Sub D. Some or all of the publisher nodes may send their publication Bloom filters to the network via multicast messaging. In some cases, the publisher nodes may send their publication Bloom filters to Sub D via a unicast message, in which case the publisher nodes already know the network address of Sub-D or may have some other mechanism for discovering that address. In this example, is also assumed that the other subscribing nodes Sub A-C are not able to directly receive the publications.

At stage 6, the subscriber node Sub-D compares each of the publication Bloom filters against the combined interests vector to determine whether there are any potential subscription matches at any of the upstream subscriber nodes. If any one of the bits set in the publication Bloom filter are also set in the combined interests vector, then a potential match is identified. In this example, Sub-C is the only direct upstream subscriber node. However, in an actual deployment there may be many additional subscriber nodes directly upstream from Sub D.

At stage 7, the matching publications are forwarded to Sub-C. Before forwarding, each forwarded publication Bloom filter may be simplified by clearing bits that were not present in the combined interests vector. In this way, information about published topics not of interest to any subscribers is automatically removed. This can improve security and also reduces the compressed size of the publication Bloom filter.

At stage 8, the subscriber node Sub-C compares each of the publication Bloom filters received from Sub D against the interests vectors received from Sub A and Sub B to determine whether there are any potential subscription matches for Sub A or Sub B. If any one of the bits set in a particular publication Bloom filter is also set in the interests vector received from Sub A, then a potential match is identified and the corresponding publication is forwarded to Sub A. If any one of the bits set in a particular publication Bloom filter is also set in the interests vector received from Sub B, then a potential match is identified and the corresponding publication is forwarded to Sub B. Before forwarding, each forwarded publication Bloom filter may be simplified by clearing bits that were not present in the interests vector.

Note that the process described above relates only to the routing of potential matches and not to the determination of whether a publication is an actual match for a subscriber node's own subscription. In addition to the routing process described above, each subscriber node may also compare each received publication Bloom filter to its own subscription Bloom filter(s) to determine whether the subscriber node is a destination match for the publication. The process for determining whether the subscriber node is a destination match for the publication is described in relation to FIG. 3.

Figure 5:
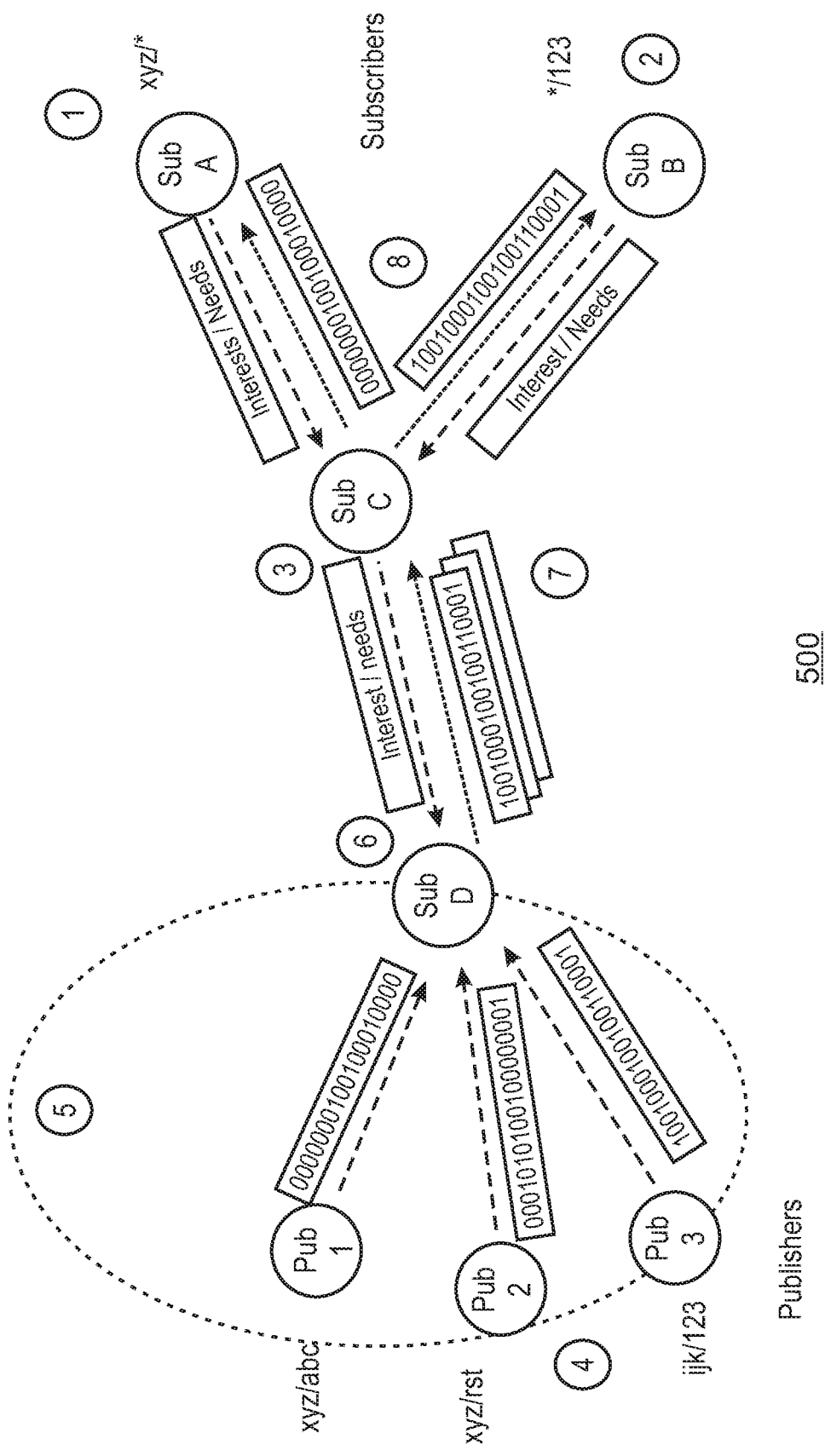
FIG. 5 is a diagram illustrating another example method of routing publications.

FIG. 5 is a diagram illustrating another example method of routing publications. The method 500 is performed by a network such as the network 200 of FIG. 2. Method 500 is similar to method 400 with the exception that routing is accomplished through the use of an interest vector and another vector referred to herein as the needs vector.

The example network shown in FIG. 5 includes three publisher nodes, Pub 1, Pub 2, and Pub 3, and four subscriber nodes Sub A, Sub B, Sub C, and Sub D. The subscriber nodes Sub A and Sub both have a subscription Bloom filter, which is generated as described above and stored in memory. The subscription Bloom filters are used to generate an interest vector and a needs vector. The initial interests vector is a copy of the subscription Bloom filter.

The initial needs vector is a locality sensitive hash of the subscription Bloom filter and includes a unary encoding of the number of bits set in the subscription Bloom filter. In one embodiment, the needs vector is computed by down-scaling the subscription bit vector down to 64 bits and OR'ing together four consecutive rotations of this 64 bit result appended to a truncated unary encoding of the bit population of subscription vector. The down-scaling operation is as described in the literature on Bloom filters wherein a large Bloom filter can be expressed as a smaller Bloom filter so long as the sizes of the two Bloom filters are related by a power of two. The truncated unary encoding is a simple unary encoding of the count of the bits set in the Bloom filter for bit counts from 0 to 63. All bit counts greater than or equal to 64 are represented as 64. The resulting needs vector has the property that if bit vector A is a superset of bit vector B, then the locality sensitive hash of vector A will be a superset of the locality sensitive hash of vector B. Other embodiments may use alternative strategies for computing the needs vector that preserve this property. The needs vectors are combined by computing the intersection of the needs vectors.

At stages 1 and 2, subscriber nodes Sub-A and Sub-B forward their subscription Bloom filters (the initial interest vectors) to the downstream subscriber node Sub C. Additionally, the subscriber nodes Sub-A and Sub-B generate corresponding needs vectors and forward the needs vectors to subscriber node Sub C.

At stage 3, the subscriber node Sub-C stores both of the interests vectors to memory and also forms a union of the two interests vectors by a bitwise OR operation. The union of the two interests vectors forms a combined interests vector that represents the subscriptions subscribed to by both Sub A and Sub B. The combined interests vector is forwarded to subscriber node Sub-D. Additionally, the subscriber node Sub-C stores both of the needs vectors to memory and also forms an intersection of the two needs vector by a bitwise AND operation. The intersection of the two needs vectors forms a combined needs vector that represents the subscriptions subscribed to by both Sub A and Sub B. The combined needs vector is also forwarded to subscriber node Sub-D.

At stage 4, the publishers Pub-1, Pub-2, and Pub-3 generate publication Bloom filters as described above. At stage 5, the publication Bloom filters are sent to the network and received at subscriber node Sub D. The publisher nodes may send their publication Bloom filters to the network via multicast or unicast messaging.

At stage 6, the subscriber node Sub-D compares each of the publication Bloom filters against the combined interests vector and the combined needs vector to determine whether there are any potential subscription matches at any of the upstream subscriber nodes. To determine whether a potential match exists, each publication is compared against the combined interests vector by taking the intersection of the publication Bloom filter and combined interests vector and computing the locality sensitive hash of the resulting intersection. This locality sensitive hash of the resulting intersection is computed using the same algorithm that is used to compute the needs vector. The publication is a potential match if the locality sensitive hash is a superset or equal to the combined needs vector.

At stage 7, the matching publications are forwarded to Sub C. Before forwarding, each forwarded publication Bloom filter may be simplified by clearing bits that were not present in the combined interests vector.

At stage 8, the subscriber node Sub C compares each of the publication Bloom filters against the interests vectors and needs vectors received from Sub A and Sub B to determine whether there are any potential subscription matches for Sub A or Sub B. To determine whether a potential match exists for Sub A, each publication is compared against the Sub A interests vector by taking the intersection of the publication Bloom filter and interests vector received from Sub A and computing the locality sensitive hash of the resulting intersection. This locality sensitive hash of the resulting intersection is computed using the same algorithm that is used to compute the needs vector. The publication is a potential match if the locality sensitive hash is a superset or equal to the needs vector received from Sub A. The publications that provide a potential match are forwarded to Sub A. The same process is followed for Sub B using the interests vector and needs vector received from Sub B. Before forwarding, each forwarded publication Bloom filter may be simplified by clearing bits that were not present in the interests vector.

In addition to the routing process described above, each subscriber node may also compare each received publication Bloom filter to its own subscription Bloom filter(s) to determine whether the subscriber node is a destination match for the publication. The process for determining whether the subscriber node is a destination match for the publication is described in relation to FIG. 3.

Figure 6:
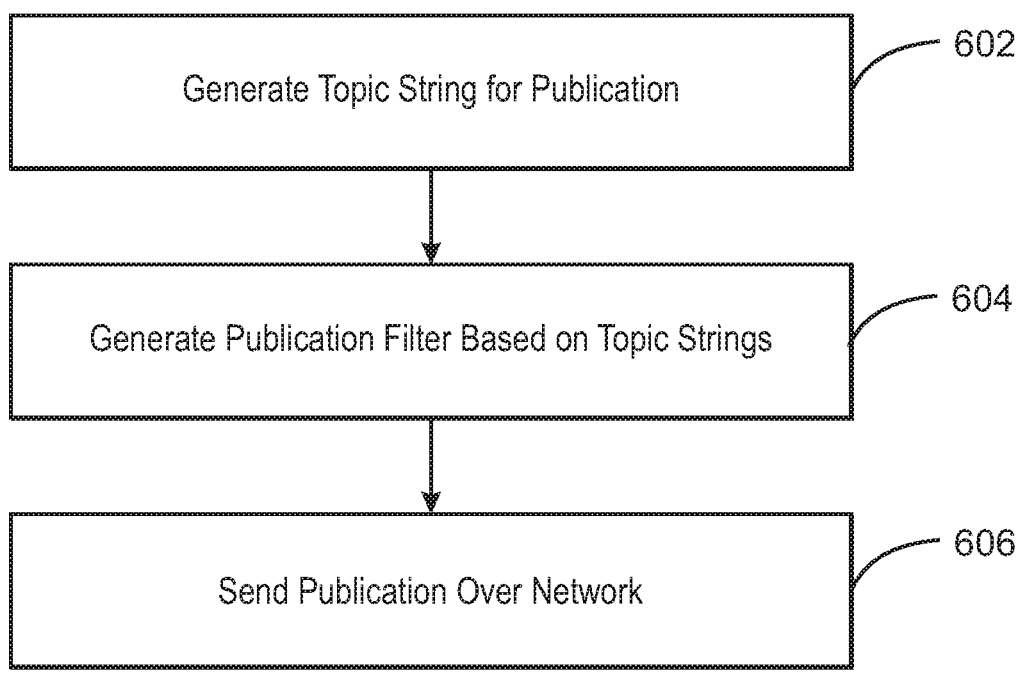
FIG. 6 is a process flow diagram summarizing a method of distributing publications.

FIG. 6 is a process flow diagram summarizing a method of distributing publications. The method 600 may be performed by a publisher in a distributed network. For example, the publisher may be any of the network devices shown in FIG. 1.

At block 602, the publisher generates a topic string for a publication. The topic string may be generated in accordance with the programming code implemented by the publisher. The topic string will generally correlate with the type of data represented in the publication. For example, in the case of an IoT sensor, the topic string may represent a type of device, a location of the device, and others.

At block 604, a publication filter is generated based on the topic string. The publication filter may be a Bloom filter or other type of AMQ filter. The publication filter may be generated as described above in relation to FIG. 2. For example, a set of substring expansions may be generated from the topic string, and each substring expansion added it to the Bloom filter. The number and type of substring expansions may be controlled by the publisher to control the number and type of wildcards that the publisher allows. Additionally, the publication filter may be encoded using run length encoding.

At block 606, the publication is sent out over the network. The publication includes the publication's data payload and the publication filter. The publication filter is used to route the publication and determine whether a subscriber node's subscription is a match for the publication. The publication may be sent to the network via unicast or multicast messaging.

The method 600 should not be interpreted as meaning that the blocks are necessarily performed in the order shown. Furthermore, fewer or greater actions can be included in the method 600 depending on the design considerations of a particular implementation.

Figure 7:
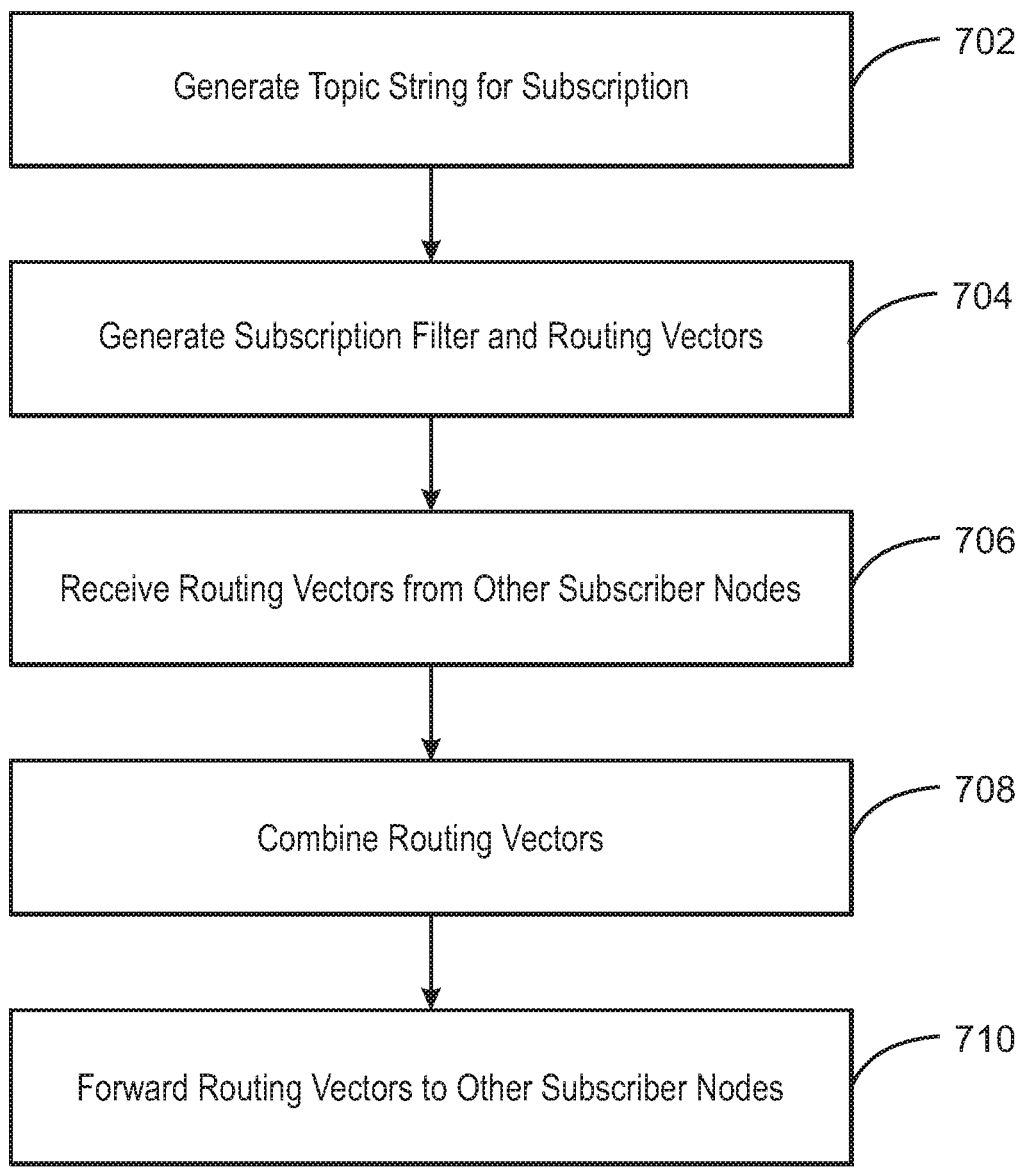
FIG. 7 is a process flow diagram summarizing a method of populating a distributed network with publication routing data.

FIG. 7 is a process flow diagram summarizing a method of populating a distributed network with publication routing data. The method 700 may be performed by a subscriber in a distributed network. For example, the subscriber may be any of the network devices shown in FIG. 1.

At block 702, the subscriber generates a topic string for a subscription. The topic string may be generated in accordance with the programming code implemented by the subscriber. The subscription topic string corresponds with data that the subscriber is programmed to consume in accordance with its programming. For example, the subscriber may be configured to consume temperature data from a set of IoT sensors within a same household or building. Processing the temperature data may include analyzing the temperature data to control heating or cooling equipment. Furthermore, the subscriber may, after performing computations on a collection of received subscriptions generate a new publication. For example, a subscriber might compute an average temperature over a set of individual temperate readings and periodically publish that average as a new publication.

At block 704, a subscription filter is generated based on the topic string. The subscription filter may be a Bloom filter or other type of AMQ filter. The subscription Bloom filter may be generated as described above in relation to FIG. 2. For example, a set of substring expansions may be generated from the topic string, depending on the number and type of wildcards. Each substring expansion is added to the subscription Bloom filter. The subscription filter is generated using the same encoding algorithms used for the generation of the publication filter. Additionally, the subscription filter may be encoded using run length encoding. The subscription filter is stored to a memory device of the subscribing node. Upon receiving a publication, the publication filter can be compared to the subscription filter to determine whether the publication matches the subscription.

Also at block 704, routing vectors are generated based on the subscription filter. The number and type of routing vectors may vary depending on the design considerations of a particular embodiment. For example, the routing vector may include only an interests vector as described in relation to FIG. 4. In some examples, the routing vector may include both an interests vector and a needs vector as described in relation to FIG. 5.

At block 706, routing vectors are received from other subscriber nodes in the network. The routing vectors are stored to a routing table that resides on a memory device of the subscriber node. The routing table maintains a record of the received routing vectors and identifies the subscriber nodes that each routing vector was received from. In the event that a subscription changes, the subscription filters and the resulting routing vectors will also change and be propagated through the network. In some examples, if a subscription changes, the changes to the routing vectors are propagated by sending subscription filter changes to the other nodes.

At block 708, the routing vectors generated at block 704 are combined with the routing vectors received from other nodes. Interests vectors may be combined by computing the union of the interests vectors using a bitwise OR operation. Needs vectors may be combined by computing the intersection of the interests vectors using a bitwise AND operation.

At block 710, the combined routing vector is forwarded to other subscriber nodes in the network. At each subscriber node, the received routing vectors are combined and forwarded.

The method 700 should not be interpreted as meaning that the blocks are necessarily performed in the order shown. Furthermore, fewer or greater actions can be included in the method 700 depending on the design considerations of a particular implementation.

Figure 8:
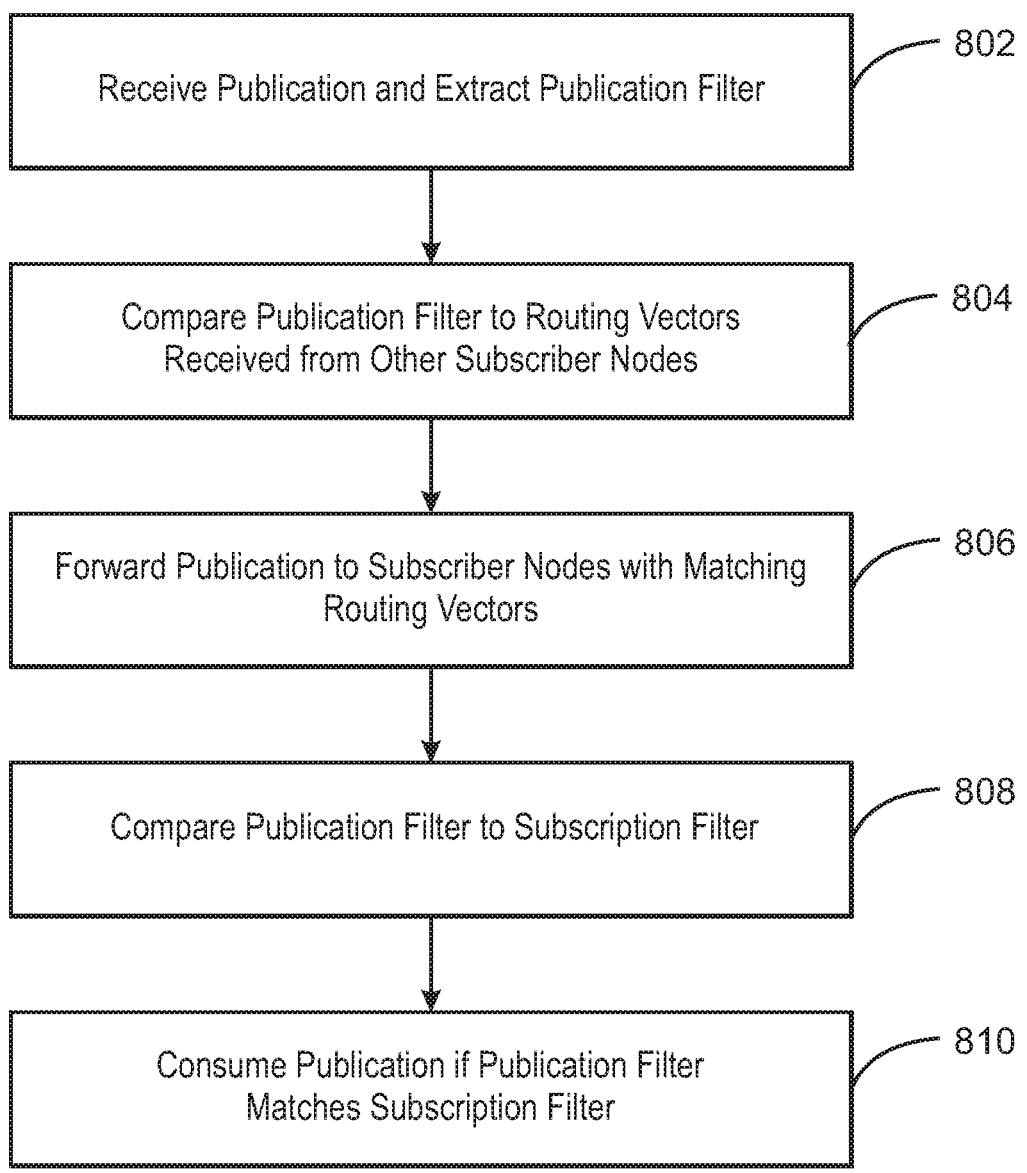
FIG. 8 is a process flow diagram summarizing a method of routing publications in a distributed network.

FIG. 8 is a process flow diagram summarizing a method of routing publications in a distributed network. The method 800 may be performed by a subscriber in a distributed network. For example, the subscriber may be any of the network devices shown in FIG. 1. Furthermore, the subscriber node performing method 800 includes a routing table populated with the routing vectors received from other subscriber nodes in the network.

At block 802, the subscriber node receives a publication and extracts the publication filter included with the publication. The publication filter may be a Bloom filter or other type of AMQ filter.

At block 804, the publication filter is compared with routing vectors stored to the routing table to identify matching subscriptions. The technique for identifying a potential match will depend on the type of AMQ filters and routing vectors used. In an embodiment that uses Bloom filters and only the interests vector, a potential match is identified if any of the bits set in the publication Bloom Filter are also set in the interests vector. In an embodiment that uses the interests vector and the needs vector, a potential match is identified by computing the intersection of the publication Bloom filter and interests vector and computing the locality sensitive hash of the resulting intersection. The publication is a potential match if the locality sensitive hash is a superset or equal to the needs vector.

At block 806, the publication is forwarded to subscriber nodes for which a potential match was identified. If a potential match is identified between the publication filter and any one of the routing vectors, the publication is forwarded to the corresponding subscriber node from which the routing vector was received.

At block 808, the publication filter is compared to the subscription filter to determine if the publication and subscription are a destination match. In an embodiment that uses Bloom filters, a destination match is identified if all of the bits set in the subscription Bloom filter are also set in the publication Bloom filter. An example method of comparing the publication Bloom filter and the subscription Bloom filter to identify a destination match is described in relation to FIG. 3.

At block 810, the publication is consumed if the publication filter and the subscription filter are determined to be a destination match. To consume the publication, the publication's data payload is extracted and processed.

The method 800 should not be interpreted as meaning that the blocks are necessarily performed in the order shown. Furthermore, fewer or greater actions can be included in the method 800 depending on the design considerations of a particular implementation.

Figure 9:
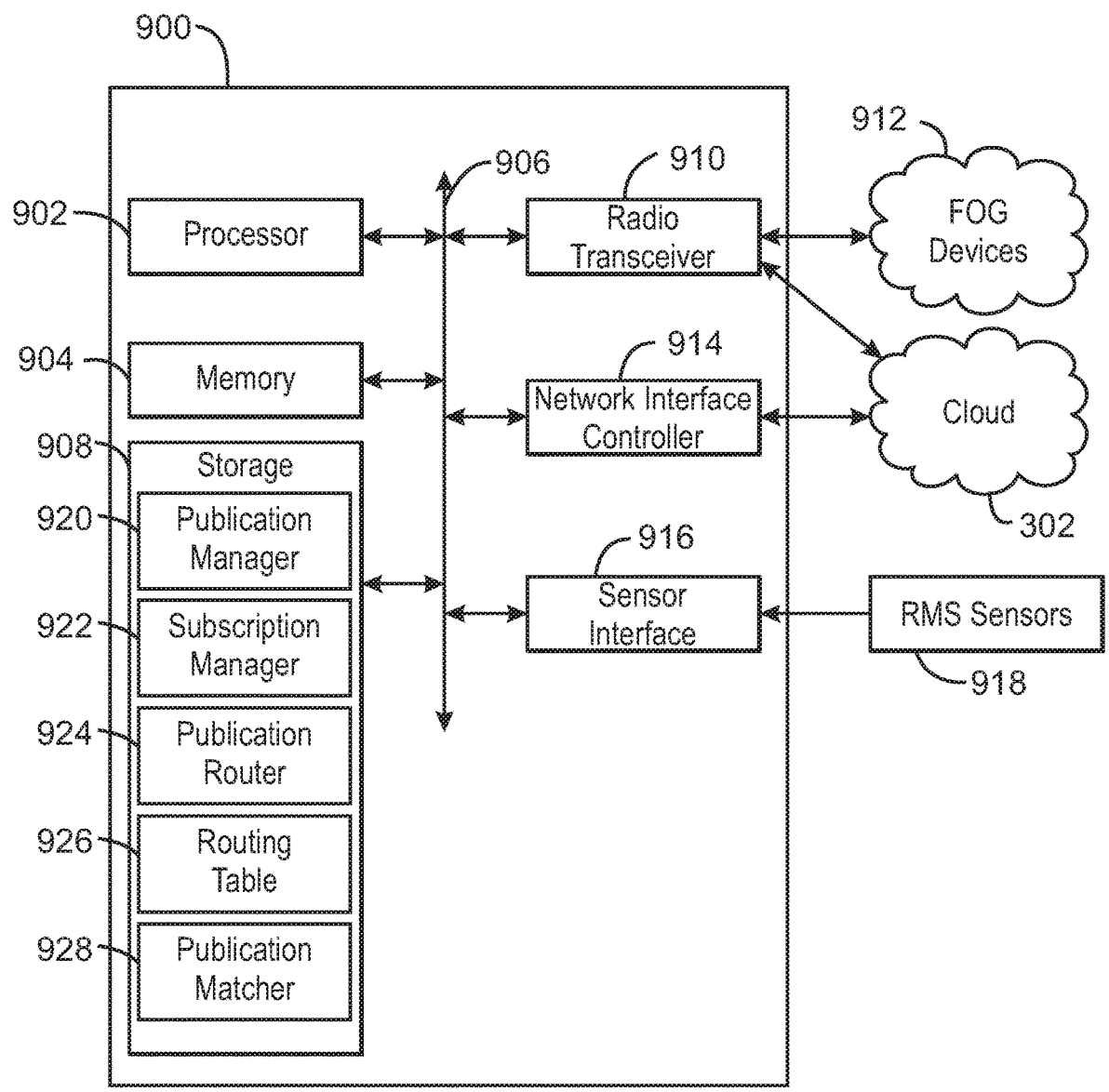

FIG. 9 is a block diagram of an example of components that may be present in a device that is part of a distributed publication/subscribe network. The device 900 may include any combinations of the components shown in the example. For example, with respect to the system of FIG. 1, the device 900 may be an IoT device 106, 114 or a server 104. With reference to FIG. 2, the device 900 may have the capability to operate as a subscriber node 202, or a publisher node 204, or both.

The components shown in FIG. 9 may be implemented as ICs, portions thereof, discrete electronic devices, or other modules, logic, hardware, software, firmware, or a combination thereof adapted in the system, or as components otherwise incorporated within a chassis of a larger system. The block diagram of FIG. 9 is intended to show a high level view of components of the device 900. However, some of the components shown may be omitted, additional components may be present, and different arrangement of the components shown may occur in other implementations.

The system 900 may include a processor 902, which may be a microprocessor, a multi-core processor, a multithreaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5, A9, or similar, processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also couple to the processor 902 via the bus 906. The mass storage 908 may be implemented via any type of non-transitory, machine-readable medium, such as a solid state disk drive (SSDD), a hard drive, an array of hard drives, an optical disk, a thumb drive, and the like. In some examples, the mass storage 908 may be implemented using a micro hard disk drive (HDD), such as in IoT devices. Further, any number of new technologies may be used for the mass storage 908 in addition to, or instead of, the technologies described, such resistance change memories, phase change memories, holographic memories, or chemical memories, among others. For example, the system 900 may incorporate the 3D XPOINT memories from Intel® and Micron®.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an I²C interface, an SPI interface, and point to point interfaces, among others.

The bus 906 may couple the processor 902 to a radio transceiver 910, for communications with the cloud 102 and/or other fog devices 912, including aggregators, gateways, and the like. The radio transceiver 910 may include any number of frequencies and protocols, such as a WLAN unit used to implement Wi-Fi™ communications in accordance with the Institute of Electrical and Electronics Engineers (IEEE) 802.11 standard. In addition, wireless wide area communications, e.g., according to a cellular or other wireless wide area protocol, may be implemented via a WWAN unit. For examples in which the device 900 is an IoT device, the radio transceiver 910 may include a radio for communications at about 2.4 gigahertz (Ghz) under the IEEE 802.15.4 standard, for example, using the Bluetooth® low energy (BTLE) standard, as defined by the Bluetooth® Special Interest Group, or the ZigBee® standard, among others. Any number of other radios, configured for a particular wireless communication protocol, may be included in the radio transceiver 910.

The radio transceiver 910 may include a low power wide area (LPWA) transceiver to communicate with substations over an LPWA link. In this example, the communications may follow the IEEE 802.15.4 and IEEE 802.15.4g standards, among others. For example, the device 900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies.

The bus 906 may couple the processor 902 to a network interface controller (NIC) 914 that may couple to the cloud 102 over a wired connection. The cloud 102 may also connect to the fog devices 912 through wired or wireless connections.

The bus 906 may couple the processor 902 to a sensor interface 916. The sensor interface 916 may be used to obtain sensor readings from sensor 918. The sensors may be configured to generate any type of sensed data, including environmental data such as temperature and others.

In examples in which the device 900 is an IoT device, for example, a number of other units may be included. For example, a battery may power components of the device 900. The battery may be a lithium ion battery, a metal-air battery, such as a zinc-air battery, an aluminum-air battery, a lithium-air battery, and the like. A battery monitor/charger may be included in the system 900 to track the state of charge (SoCh) of the battery. The battery monitor/charger may be used to monitor other parameters of the battery to provide failure predictions, such as the state of health (SoH) and the state of function (SoF) of the battery. The battery monitor/charger may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger may communicate the information on the battery to the processor 902 over the bus 906. The battery monitor/charger may also include an analog-to-digital (ADC) convertor that allows the processor 902 to directly monitor the voltage of the battery, or, with appropriate circuitry, the current flow from the battery.

A power block, or other power supply coupled to a grid, may be coupled with the battery monitor/charger to charge the battery. In some examples, the power block may be replaced with a wireless power receiver to obtain the power wirelessly, for example, through a loop antenna in the device 900. A battery charging circuit, such as an LTC4020 chip from Linear Technologies of Milpitas, Calif., among others, may be included in the battery monitor/charger. The specific charging circuits chosen depend on the size of the battery, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The storage 908 may contain various components to enable the device 900 to become a member of a distributed publication-subscribe network. For example, the storage 908 can include a publication manager 920, which generates publication filters and sends publications out onto the network as described in relation to FIG. 6. The storage 908 can include a subscription manager 922, which generates subscription filters and routing vectors and sends the routing vectors onto the network as described in relation to FIG. 7. The storage 908 can include a publication router 924, which receives publications and routes the publications to the appropriate subscriptions nodes based on a comparison of the publication filter and the routing vectors, as described in relation to FIG. 8. The storage 908 can also include a routing table 926, which stores the routing vectors corresponding to subscriptions received from other nodes. The storage 908 can also include a publication matcher 928 that compares the publication filters to the node's own subscription filters to determine whether the publication is a destination match and should be consumed by the node.

Examples

Example 1 is an electronic device for use in a publish-subscribe messaging system. The electronic device includes a storage device; and a processor. The processor is to generate a topic string including a string of characters that represent a subscription to a requested publication; generate a subscription filter based on the topic string; receive a publication including a data payload and a publication filter; perform a bitwise comparison of the subscription filter and the publication filter to determine whether the publication is a destination match for the subscription; and if the publication is a destination match for the subscription, consume the data payload of the publication. Optionally, the subscription filter and the publication filter may be Bloom filters.

Example 2 includes the electronic device of example 1, including or excluding optional features. In this example, the processor is to generate a routing vector based on the subscription filter and send the routing vector to a downstream subscriber node. Optionally, the routing vector is run length encoded.

Example 3 includes the electronic device of any one of examples 1 to 2, including or excluding optional features. In this example, the processor is to: generate a first routing vector based on the subscription filter; receive a second routing vector from an upstream subscriber node; combine the first routing vector and second routing vector to generate a combined routing vector; and send the combined routing vector to a downstream subscriber node.

Example 4 includes the electronic device of any one of examples 1 to 3, including or excluding optional features. In this example, the processor is to generate an interests vector based on the subscription filter, wherein the interests vector is equal to the subscription filter.

Example 5 includes the electronic device of any one of examples 1 to 4, including or excluding optional features. In this example, the processor is to: generate a first interests vector based on the subscription filter; receive a second interests vector from an upstream subscriber node; combine the first interests vector and second interests vector via a bitwise AND operation to generate a combined interests vector; and send the combined interests vector to a downstream subscriber node.

Example 6 includes the electronic device of any one of examples 1 to 5, including or excluding optional features. In this example, the processor is to generate a needs vector based on the subscription filter, wherein the needs vector is a locality sensitive hash of the subscription filter and includes a unary encoding of a number of bits set in the subscription filter.

Example 7 includes the electronic device of any one of examples 1 to 6, including or excluding optional features. In this example, the processor is to: generate a first needs vector based on the subscription filter; receive a second needs vector from an upstream subscriber node; combine the first needs vector and second needs vector via a bitwise OR operation to generate a combined needs vector; and send the combined needs vector to a downstream subscriber node.

Example 8 includes the electronic device of any one of examples 1 to 7, including or excluding optional features. In this example, the processor is to: receive an interests vector from an upstream subscriber node; compare the interests vector to the publication filter; and if any bit set in the interests vector is also set in the publication filter, forward the publication to the upstream subscriber node.

Example 9 includes the electronic device of any one of examples 1 to 8, including or excluding optional features. In this example, the processor is to: receive an interests vector and a needs vector from an upstream subscriber node; compute an intersection of the publication filter and the interests vector and compute a locality sensitive hash of the intersection; and if the locality sensitive hash is a superset or equal to the needs vector, forward the publication to the upstream subscriber node.

Example 10 is a method of operating a subscriber node in a publish-subscribe messaging system. The method includes generating a topic string including a string of characters that represent a subscription to a requested publication; generating a subscription filter based on the topic string; receiving a publication including a data payload and a publication filter; performing a bitwise comparison of the subscription filter and the publication filter to determine whether the publication is a destination match for the subscription; and if the publication is a destination match for the subscription, consuming the data payload of the publication. Optionally, the subscription filter and the publication filter may be Bloom filters.

Example 11 includes the method of example 10, including or excluding optional features. In this example, the method includes generating a routing vector based on the subscription filter and sending the routing vector to a downstream subscriber node. Optionally, the routing vector is run length encoded.

Example 12 includes the method of any one of examples 10 to 11, including or excluding optional features. In this example, the method includes generating a first routing vector based on the subscription filter; receiving a second routing vector from an upstream subscriber node; combining the first routing vector and second routing vector to generate a combined routing vector; and sending the combined routing vector to a downstream subscriber node.

Example 13 includes the method of any one of examples 10 to 12, including or excluding optional features. In this example, the method includes generating an interests vector based on the subscription filter, wherein the interests vector is equal to the subscription filter.

Example 14 includes the method of any one of examples 10 to 13, including or excluding optional features. In this example, the method includes generating a first interests vector based on the subscription filter; receiving a second interests vector from an upstream subscriber node; combining the first interests vector and second interests vector via a bitwise AND operation to generate a combined interests vector; and sending the combined interests vector to a downstream subscriber node.

Example 15 includes the method of any one of examples 10 to 14, including or excluding optional features. In this example, the method includes generating a needs vector based on the subscription filter, wherein the needs vector is a locality sensitive hash of the subscription filter and includes a unary encoding of a number of bits set in the subscription filter.

Example 16 includes the method of any one of examples 10 to 15, including or excluding optional features. In this example, the method includes generating a first needs vector based on the subscription filter; receiving a second needs vector from an upstream subscriber node; combining the first needs vector and second needs vector via a bitwise OR operation to generate a combined needs vector; and sending the combined needs vector to a downstream subscriber node.

Example 17 includes the method of any one of examples 10 to 16, including or excluding optional features. In this example, the method includes receiving an interests vector from an upstream subscriber node; comparing the interests vector to the publication filter; and if any bit set in the interests vector is also set in the publication filter, forwarding the publication to the upstream subscriber node.

Example 18 includes the method of any one of examples 10 to 17, including or excluding optional features. In this example, the method includes receiving an interests vector and a needs vector from an upstream subscriber node; computing an intersection of the publication filter and the interests vector and computing a locality sensitive hash of the intersection; and if the locality sensitive hash is a superset or equal to the needs vector, forwarding the publication to the upstream subscriber node.

Example 19 is a tangible, non-transitory, computer-readable medium including instructions that, when executed by a processor, direct the processor to operate a subscriber node in a publish-subscribe messaging system. The computer-readable medium includes instructions that direct the processor to: generate a topic string including a string of characters that represent a subscription to a requested publication; generate a subscription filter based on the topic string; receive a publication including a data payload and a publication filter; perform a bitwise comparison of the subscription filter and the publication filter to determine whether the publication is a destination match for the subscription; and if the publication is a destination match for the subscription, consume the data payload of the publication. Optionally, the subscription filter and the publication filter may be Bloom filters.

Example 20 includes the computer-readable medium of example 19, including or excluding optional features. In this example, the computer-readable medium includes instructions to direct the processor to generate a routing vector based on the subscription filter and send the routing vector to a downstream subscriber node. Optionally, the routing vector is run length encoded.

Example 21 includes the computer-readable medium of any one of examples 19 to 20, including or excluding optional features. In this example, the computer-readable medium includes instructions to direct the processor to: generate a first routing vector based on the subscription filter; receive a second routing vector from an upstream subscriber node; combine the first routing vector and second routing vector to generate a combined routing vector; and send the combined routing vector to a downstream subscriber node.

Example 22 includes the computer-readable medium of any one of examples 19 to 21, including or excluding optional features. In this example, the computer-readable medium includes instructions to direct the processor to generate an interests vector based on the subscription filter, wherein the interests vector is equal to the subscription filter.

Example 23 includes the computer-readable medium of any one of examples 19 to 22, including or excluding optional features. In this example, the computer-readable medium includes instructions to direct the processor to: generate a first interests vector based on the subscription filter; receive a second interests vector from an upstream subscriber node; combine the first interests vector and second interests vector via a bitwise AND operation to generate a combined interests vector; and send the combined interests vector to a downstream subscriber node.

Example 24 includes the computer-readable medium of any one of examples 19 to 23, including or excluding optional features. In this example, the computer-readable medium includes instructions to direct the processor to generate a needs vector based on the subscription filter, wherein the needs vector is a locality sensitive hash of the subscription filter and includes a unary encoding of a number of bits set in the subscription filter.

Example 25 includes the computer-readable medium of any one of examples 19 to 24, including or excluding optional features. In this example, the computer-readable medium includes instructions to direct the processor to: generate a first needs vector based on the subscription filter; receive a second needs vector from an upstream subscriber node; combine the first needs vector and second needs vector via a bitwise OR operation to generate a combined needs vector; and send the combined needs vector to a downstream subscriber node.

Example 26 includes the computer-readable medium of any one of examples 19 to 25, including or excluding optional features. In this example, the computer-readable medium includes instructions to direct the processor to: receive an interests vector from an upstream subscriber node; compare the interests vector to the publication filter; and if any bit set in the interests vector is also set in the publication filter, forward the publication to the upstream subscriber node.

Example 27 includes the computer-readable medium of any one of examples 19 to 26, including or excluding optional features. In this example, the computer-readable medium includes instructions to direct the processor to: receive an interests vector and a needs vector from an upstream subscriber node; compute an intersection of the publication filter and the interests vector and compute a locality sensitive hash of the intersection; and if the locality sensitive hash is a superset or equal to the needs vector, forward the publication to the upstream subscriber node.

Example 28 is an apparatus for use in a publish-subscribe messaging system. The apparatus includes means for generating a topic string including a string of characters that represent a subscription to a requested publication; means for generating a subscription filter based on the topic string; means for receiving a publication including a data payload and a publication filter; means for performing a bitwise comparison of the subscription filter and the publication filter to determine whether the publication is a destination match for the subscription; and means for consuming the data payload of the publication if the publication is a destination match for the subscription. Optionally, the subscription filter and the publication filter may be Bloom filters.

Example 29 includes the apparatus of example 28, including or excluding optional features. In this example, the apparatus includes means for generating a routing vector based on the subscription filter and send the routing vector to a downstream subscriber node. Optionally, the routing vector is run length encoded.

Example 30 includes the apparatus of any one of examples 28 to 29, including or excluding optional features. In this example, the apparatus includes means for generating a first routing vector based on the subscription filter; means for receiving a second routing vector from an upstream subscriber node; means for combining the first routing vector and second routing vector to generate a combined routing vector; and means for sending the combined routing vector to a downstream subscriber node.

Example 31 includes the apparatus of any one of examples 28 to 30, including or excluding optional features. In this example, the interests vector is equal to the subscription filter.

Example 32 includes the apparatus of any one of examples 28 to 31, including or excluding optional features. In this example, the apparatus includes means for generating a first interests vector based on the subscription filter; means for receiving a second interests vector from an upstream subscriber node; means for combining the first interests vector and second interests vector via a bitwise AND operation to generate a combined interests vector; and means for sending the combined interests vector to a downstream subscriber node.

Example 33 includes the apparatus of any one of examples 28 to 32, including or excluding optional features. In this example, the apparatus includes means for generating a needs vector based on the subscription filter, wherein the needs vector is a locality sensitive hash of the subscription filter and includes a unary encoding of a number of bits set in the subscription filter.

Example 34 includes the apparatus of any one of examples 28 to 33, including or excluding optional features. In this example, the apparatus includes means for generating a first needs vector based on the subscription filter; means for receiving a second needs vector from an upstream subscriber node; means for combining the first needs vector and second needs vector via a bitwise OR operation to generate a combined needs vector; and means for sending the combined needs vector to a downstream subscriber node.

Example 35 includes the apparatus of any one of examples 28 to 34, including or excluding optional features. In this example, the apparatus includes means for receiving an interests vector from an upstream subscriber node; means for comparing the interests vector to the publication filter; and means for forwarding the publication to the upstream subscriber node if any bit set in the interests vector is also set in the publication filter.

Example 36 includes the apparatus of any one of examples 28 to 35, including or excluding optional features. In this example, the apparatus includes means for receiving an interests vector and a needs vector from an upstream subscriber node; means for computing an intersection of the publication filter and the interests vector and compute a locality sensitive hash of the intersection; and means for forwarding the publication to the upstream subscriber node if the locality sensitive hash is a superset or equal to the needs vector.

Example 37 is an electronic device for use in a publish-subscribe messaging system. The electronic device includes a storage device and a processor. The processor is to: generate a topic string including a string of characters that represent a publication to be published by the electronic device; generate a publication filter based on the topic string; generate a publication including a data payload and the publication filter; and send the publication to a network device. Optionally, the subscription filter and the publication filter may be bloom filters.

Example 38 includes the electronic device of example 37, including or excluding optional features. In this example, the publication is represented by the topic string and at least one additional topic string, and processor is to generate the publication filter based on the topic string and the at least one additional topic string.

Example 39 includes the electronic device of any one of examples 37 to 38, including or excluding optional features. In this example, to generate the publication filter based on the topic string, the processor is to decompose the topic string into a set of substring expansions and encode each one of the set of substring expansions into the publication filter. Optionally, the set of substring expansions generated by the processor is controlled to control a number and type of wildcards that can be used by a subscriber to match the publication.

Example 40 includes the electronic device of any one of examples 37 to 39, including or excluding optional features. In this example, the processor is to encode the publication filter using run length encoding.

Example 41 is a method of operating a publisher node in a publish-subscribe messaging system. The method includes generating a topic string including a string of characters that represent a publication to be published; generating a publication filter based on the topic string; generating a publication including a data payload and the publication filter; and sending the publication to a network device. Optionally, the publication filter may be a Bloom filter.

Example 42 includes the method of example 41, including or excluding optional features. In this example, the publication is represented by the topic string and at least one additional topic string, and the method includes generating the publication filter based on the topic string and the at least one additional topic string.

Example 43 includes the method of any one of examples 41 to 42, including or excluding optional features. In this example, generating the publication filter based on the topic string includes decomposing the topic string into a set of substring expansions and encoding each one of the set of substring expansions into the publication filter. Optionally, the method includes controlling the set of substring expansions generated to control a number and type of wildcards that can be used by a subscriber to match the publication.

Example 44 includes the method of any one of examples 41 to 43, including or excluding optional features. In this example, the method includes encoding the publication filter using run length encoding.

Example 45 is a tangible, non-transitory, computer-readable medium including instructions that, when executed by a processor, direct the processor to operate a publisher node in a publish-subscribe messaging system. The computer-readable medium includes instructions that direct the processor to: generate a topic string including a string of characters that represent a publication to be published; generate a publication filter based on the topic string; generate a publication including a data payload and the publication filter; and send the publication to a network device. Optionally, the publication filter may be a Bloom filter.

Example 46 includes the computer-readable medium of example 45, including or excluding optional features. In this example, the publication is represented by the topic string and at least one additional topic string, and the instructions are to direct the processor to generate the publication filter based on the topic string and the at least one additional topic string.

Example 47 includes the computer-readable medium of any one of examples 45 to 46, including or excluding optional features. In this example, to generate the publication filter based on the topic string, the instructions are to direct the processor to decompose the topic string into a set of substring expansions and encode each one of the set of substring expansions into the publication filter. Optionally, the instructions direct the processor to generate the set of substring expansions to control a number and type of wildcards that can be used by a subscriber to match the publication.

Example 48 includes the computer-readable medium of any one of examples 45 to 47, including or excluding optional features. In this example, the instructions are to direct the processor to encode the publication filter using run length encoding.

Example 49 is an apparatus for use in a publish-subscribe messaging system. The apparatus includes: means for generating a topic string including a string of characters that represent a publication to be published by the apparatus; means for generating a publication filter based on the topic string; means for generating a publication including a data payload and the publication filter; and means for sending the publication to a network device. Optionally, the publication filter may be a Bloom filter.

Example 50 includes the apparatus of example 49, including or excluding optional features. In this example, the publication is represented by the topic string and at least one additional topic string, and the apparatus includes means for generating the publication filter based on the topic string and the at least one additional topic string.

Example 51 includes the apparatus of any one of examples 49 to 50, including or excluding optional features. In this example, the means for generating the publication filter based on the topic string includes means for decomposing the topic string into a set of substring expansions and encoding each one of the set of substring expansions into the publication filter. Optionally, the means for generating the publication filter based on the topic string is to control the set of substring expansions to control a number and type of wildcards that can be used by a subscriber to match the publication.

Example 52 includes the apparatus of any one of examples 49 to 51, including or excluding optional features. In this example, the apparatus includes means for encoding the publication filter using run length encoding.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An electronic device for use in a publish-subscribe messaging system, the electronic device comprising:
   a storage device; and
   a processor to:
   generate a topic string comprising a string of characters that represent a subscription to a requested publication;
   generate a subscription filter based on the topic string;
   receive a publication comprising a data payload and a publication filter;
   perform a bitwise comparison of the subscription filter and the publication filter to determine whether the publication is a destination match for the subscription; and
   if the publication is a destination match for the subscription, consume the data payload of the publication.

2. The electronic device of claim 1, wherein the processor is to generate a routing vector based on the subscription filter and send the routing vector to a downstream subscriber node.

3. The electronic device of claim 1, wherein the subscription filter and the publication filter are Bloom filters.

4. The electronic device of claim 1, wherein the processor is to:
   generate a first routing vector based on the subscription filter;
   receive a second routing vector from an upstream subscriber node;
   combine the first routing vector and second routing vector to generate a combined routing vector; and
   send the combined routing vector to a downstream subscriber node.

5. The electronic device of claim 1, wherein the processor is to generate an interests vector based on the subscription filter, wherein the interests vector is equal to the subscription filter.

6. The electronic device of claim 1, wherein the processor is to:
   generate a first interests vector based on the subscription filter;
   receive a second interests vector from an upstream subscriber node;
   combine the first interests vector and second interests vector via a bitwise AND operation to generate a combined interests vector; and
   send the combined interests vector to a downstream subscriber node.

7. The electronic device of claim 1, wherein the processor is to generate a needs vector based on the subscription filter, wherein the needs vector is a locality sensitive hash of the subscription filter and includes a unary encoding of a number of bits set in the subscription filter.

8. The electronic device of claim 1, wherein the processor is to:
   generate a first needs vector based on the subscription filter;
   receive a second needs vector from an upstream subscriber node;
   combine the first needs vector and second needs vector via a bitwise OR operation to generate a combined needs vector; and
   send the combined needs vector to a downstream subscriber node.

9. The electronic device of claim 1, wherein the processor is to:
   receive an interests vector from an upstream subscriber node;
   compare the interests vector to the publication filter; and
   if any bit set in the interests vector is also set in the publication filter, forward the publication to the upstream subscriber node.

10. The electronic device of claim 1, wherein the processor is to:
    receive an interests vector and a needs vector from an upstream subscriber node;
    compute an intersection of the publication filter and the interests vector and compute a locality sensitive hash of the intersection; and
    if the locality sensitive hash is a superset or equal to the needs vector, forward the publication to the upstream subscriber node.

11. A method of operating a subscriber node in a publish-subscribe messaging system, the method comprising:
    generating a topic string comprising a string of characters that represent a subscription to a requested publication;
    generating a subscription filter based on the topic string;
    receiving a publication comprising a data payload and a publication filter;

performing a bitwise comparison of the subscription filter and the publication filter to determine whether the publication is a destination match for the subscription; and if the publication is a destination match for the subscription, consuming the data payload of the publication.

12. The method of claim 11, comprising:
generating a first routing vector based on the subscription filter;
receiving a second routing vector from an upstream subscriber node;
combining the first routing vector and second routing vector to generate a combined routing vector; and
sending the combined routing vector to a downstream subscriber node.

13. The method of claim 11, comprising:
generating a first interests vector based on the subscription filter;
receiving a second interests vector from an upstream subscriber node;
combining the first interests vector and second interests vector via a bitwise AND operation to generate a combined interests vector; and
sending the combined interests vector to a downstream subscriber node.

14. The method of claim 11, comprising generating a needs vector based on the subscription filter, wherein the needs vector is a locality sensitive hash of the subscription filter and includes a unary encoding of a number of bits set in the subscription filter.

15. The method of claim 11, comprising:
generating a first needs vector based on the subscription filter;
receiving a second needs vector from an upstream subscriber node;
combining the first needs vector and second needs vector via a bitwise OR operation to generate a combined needs vector; and
sending the combined needs vector to a downstream subscriber node.

16. The method of claim 11, comprising:
receiving an interests vector from an upstream subscriber node;
comparing the interests vector to the publication filter; and
if any bit set in the interests vector is also set in the publication filter, forwarding the publication to the upstream subscriber node.

17. The method of claim 11, comprising:
receiving an interests vector and a needs vector from an upstream subscriber node;
computing an intersection of the publication filter and the interests vector and computing a locality sensitive hash of the intersection; and
if the locality sensitive hash is a superset or equal to the needs vector, forwarding the publication to the upstream subscriber node.

18. The method of claim 11, comprising generating a routing vector based on the subscription filter and sending the routing vector to a downstream subscriber node.

19. The method of claim 11, wherein the subscription filter and the publication filter are Bloom filters.

20. The method of claim 11, comprising generating an interests vector based on the subscription filter, wherein the interests vector is equal to the subscription filter.

21. A tangible, non-transitory, computer-readable medium comprising instructions that, when executed by a processor, direct the processor to operate a subscriber node in a publish-subscribe messaging system, the instructions to direct the processor to:
generate a topic string comprising a string of characters that represent a subscription to a requested publication;
generate a subscription filter based on the topic string;
receive a publication comprising a data payload and a publication filter;
perform a bitwise comparison of the subscription filter and the publication filter to determine whether the publication is a destination match for the subscription; and
if the publication is a destination match for the subscription, consume the data payload of the publication.

22. The computer-readable medium of claim 21, comprising instructions to direct the processor to:
generate a first interests vector based on the subscription filter;
receive a second interests vector from an upstream subscriber node;
combine the first interests vector and second interests vector via a bitwise AND operation to generate a combined interests vector; and
send the combined interests vector to a downstream subscriber node.

23. The computer-readable medium of claim 21, comprising instructions to direct the processor to:
generate a first needs vector based on the subscription filter;
receive a second needs vector from an upstream subscriber node;
combine the first needs vector and second needs vector via a bitwise OR operation to generate a combined needs vector; and
send the combined needs vector to a downstream subscriber node.

24. The computer-readable medium of claim 21, comprising instructions to direct the processor to:
receive an interests vector from an upstream subscriber node;
compare the interests vector to the publication filter; and
if any bit set in the interests vector is also set in the publication filter, forward the publication to the upstream subscriber node.

25. The computer-readable medium of claim 21, comprising instructions to direct the processor to:
receive an interests vector and a needs vector from an upstream subscriber node;
compute an intersection of the publication filter and the interests vector and compute a locality sensitive hash of the intersection; and
if the locality sensitive hash is a superset or equal to the needs vector, forward the publication to the upstream subscriber node.

* * * * *